UNITED STATES PATENT OFFICE.

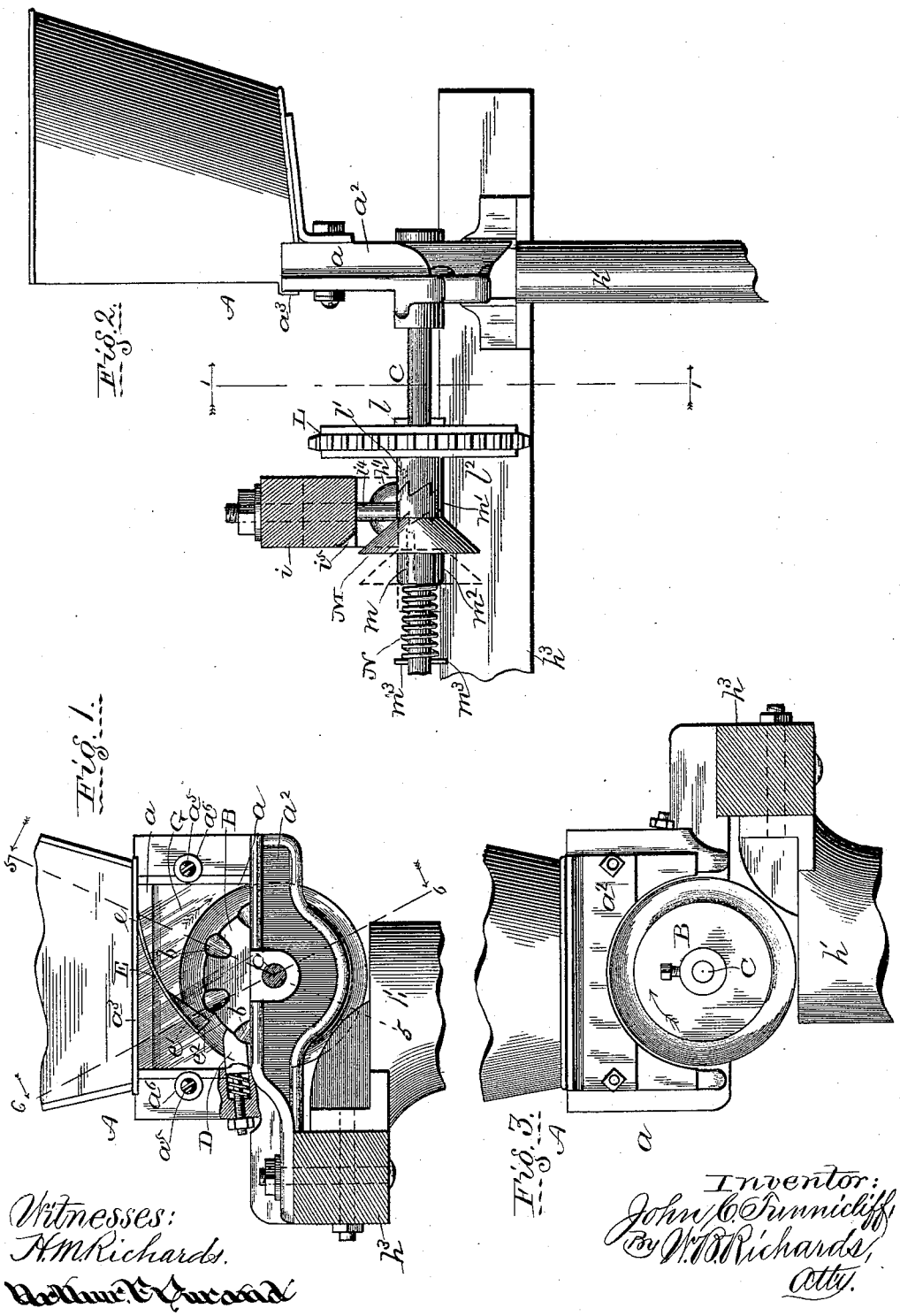

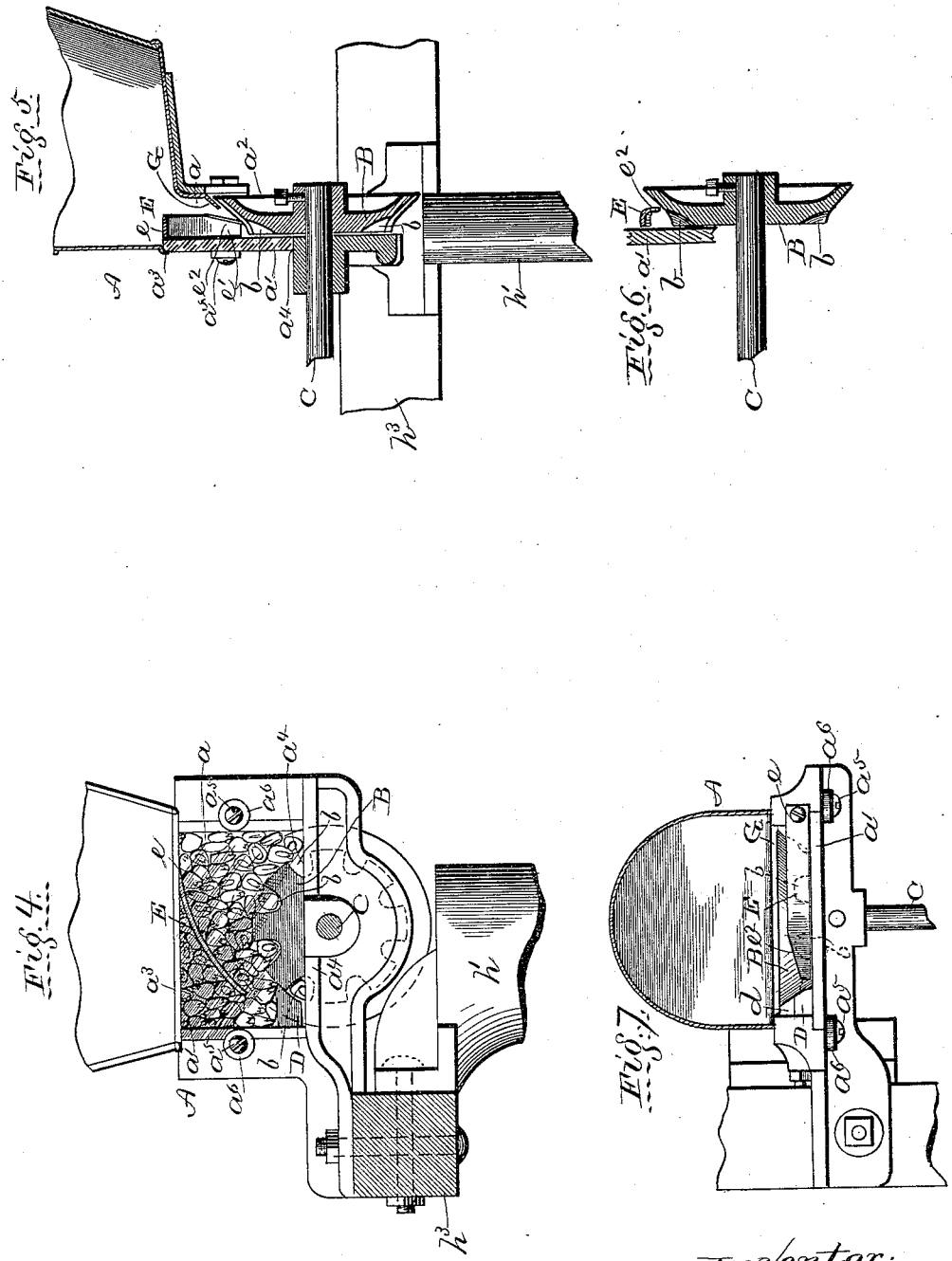

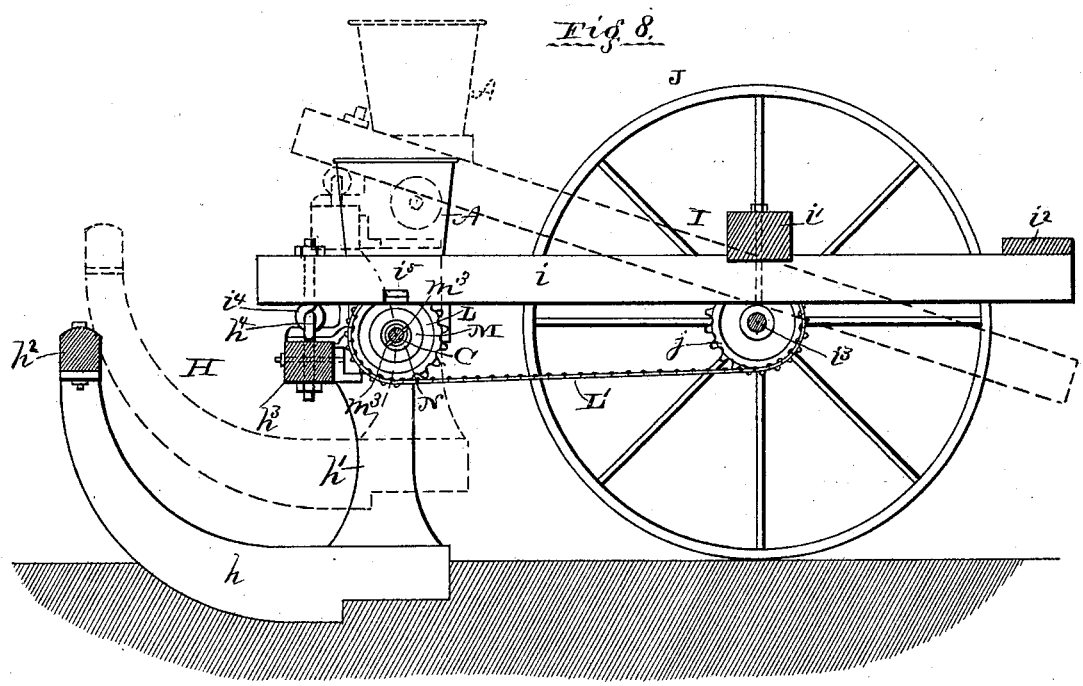

JOHN C. TUNNICLIFF, OF GALESBURG, ILLINOIS.

CORN-PLANTER.

SPECIFICATION forming part of Letters Patent No. 472,281, dated April 5, 1892.

Application filed January 28, 1892. Serial No. 419,501. (No model.)

*To all whom it may concern:*

Be it known that I, JOHN C. TUNNICLIFF, a citizen of the United States, residing at Galesburg, in the county of Knox and State of Illinois, have invented certain new and useful Improvements in Corn-Planters, of which the following is a specification.

The main feature of my present invention relates to the mechanism in corn-planter seed-boxes for measuring charges of seed, separating them from the mass of seed in the seed-box, and delivering them to the seed-tube, either for direct delivery to the soil for drill-planting or for delivery to a valve in the seed-tube, which retains them until a charge sufficient is obtained, when it is made to discharge them to the soil for planting in check-rows by means of any suitable check-row mechanism for operating said valve in the seed-tube; and the object of my present improvements in respect to the feature recited above is to insure great certainty in separating single grains of corn from their fellows in the seed-box and delivering them singly and separately to the seed-tube, and to accomplish this object with mechanism which, while efficient in operation, shall be economic of manufacture and not intricate, but simple and easily understood and operated.

To the end of attaining the foregoing objects my invention consists in a seed-cup disk which rotates in a vertical plane in contact with the side of the seed-box or other fixed plate and which has grooves or recesses in its periphery, oblique or inclined to the plane of their revolution with said disk, which grooves, together with the fixed part with which they revolve in contact, constitute seed-cups for receiving single grains of corn and delivering them to the seed-tube; and to the same end the invention further consists in subsidiary and novel structural features and combinations hereinafter described, and specified in claims hereto appended.

A further object of my improvement is to furnish automatic means for engaging the planter wheel or wheels with the seed-cup disk when the forward frame of a two-frame planter is lowered into position for planting and for throwing the same parts out of gear-connection when the forward frame is raised above the ground; and to the end of attaining this object my invention consists in a clutch-coupling, which is operated to throw the seed-cup disk out of gear connection with the planter wheel or wheels when the front frame of the planter is elevated by means of one of the frame-bars of the rear frame, as a clutch-shifting lever, coming in contact with a cone-shaped sliding and revolving cam-wheel which is connected with one member of the clutch to slide it laterally and disengage it from the other member, and which sliding cam is moved in an opposite direction by a spring acting as a pressure-organ to throw the same parts into gear connection for revolving the seed-cup disk when the front frame is lowered, as hereinafter fully described and claimed.

The accompanying drawings illustrate my improvements and so much of an ordinary corn-planting machine as is necessary to show their connection therewith and mode of operation.

In said drawings, Figure 1 is a side elevation of the lower part of the seed-box, partly broken away to show the cut-off, and of other adjacent parts and a sectional elevation in the line 1 1 in Fig. 2; Fig. 2, a rear elevation, partly in section, of parts hereinafter referred to; Fig. 3, a side elevation of the parts shown at Fig. 1, seen from the side opposite to that shown at Fig. 1; Fig. 4, the same side elevation as Fig. 1, but showing the seed-box charged with corn; Fig. 5, a sectional elevation in the line 5 5 in Fig. 1; Fig. 6, a sectional elevation of the seed-cup disk on its shaft and of the spring-finger feed and part of one side of the seed-box; Fig. 7, a top plan of the parts shown at Fig. 1; Fig. 8, a sectional elevation of a two-row corn-planter embodying my improvements on a line between the center and right-hand side of the planter.

My improvements, as shown, are embodied in a planter having two seed-boxes, only one of which is shown, for planting two rows at each passage of the machine and in that type of such planters in which a rear frame supported on wheels is hinged at its forward end to a forward frame on which the seed measuring and dropping devices are mounted, and which forward frame is formed partly by the runners and seed-tubes and is raised and lowered by tilting the rear frame by means of a lever or otherwise. It will be understood, however, that my improvements in the seed measuring and dropping mechanism in the seed-box may be applied to planters with different constructive forms and different organization from that shown, whether used as a single-row or multiple-row planter, and whether or not used with my automatic mechanism for engaging and disengaging the gear connection of the planter-wheel and seed-cup disk.

The lower part $a$ of the seed-box A is contracted laterally, as shown at Figs. 2 and 5, to form what may be termed a "casing" for the seed-cup disk B, which is fixed, as shown at Fig. 3, to a shaft C, that extends across the planter to another similar seed-box (not shown) and has suitable bearings in said casing. The seed-cup disk is sub-conical in form, or has a periphery inclined to its axis of revolution and has grooves or seed-cups $b$, which have their larger ends in the periphery and their smaller ends in the narrower base of the disk, and which, while radial to the disk, are inclined to the plane of their revolutions therewith, as shown. The disk B fits snugly at its sides against the sides $a'$ $a^2$ of the casing $a$, so that the seeds are retained in the seed-cups $b$ partly by the side $a'$ of the casing. While I find by experience that the inclined or conical periphery is an advantage to the seed-cup disk, it will still operate somewhat successfully with a periphery that is in line with its axis of revolution.

D is an ordinary yielding spring cut-off, the inner end of which is fitted to the periphery of the disk B (see Fig. 1) and extends over the seed-cups as they pass, and together with a fixed block $d$ (see Fig. 7) prevents any seeds passing out of the seed-box, except as carried out by the seed-cups past the cut-off.

E is a spring-finger fixed at one end $e$ to the casing $a$, and extending downwardly in the direction of the revolution of and to within a short distance of the seed-cups (see Fig. 1) and has at its lower end $e'$ a flange $e^2$ on its distant side from the side $a'$ of the casing $a$, the lower edge or end of which flange preferably extends to or nearly to the periphery of the disk B. The length of the spring-finger E is such that it extends across above all of the seed-cups of the disk D that may be uppermost, as shown at Fig. 7, and its width is such (see Fig. 5) that, while it permits the grains of corn to reach the seed-cup disk past its side, it so nearly fills the space in the case $a$ as to support most of the weight of the seed above it, so that the corn between the spring and the seed-cup disk will be in a loose condition (see Fig. 4) and not pressed downward by the weight of corn above it to interfere with the easy rotation of said disk.

Seed-cups, as shown, in the periphery and side of a disk which rotates in a vertical plane, are, when of a proper size, to a considerable extent certain to receive one grain of corn each, and carry it past the cut-off for delivery to the seed-tube. The spring-finger E will render it almost certain that each seed-cup receives its single grain of corn, as the corn-grains beneath its free end will be pressed on slightly with a yielding spring-pressure to cause them to enter the seed-cups, and this tendency to enter the seed-cups is increased by the pendent flange $e^2$ and the side wall $a'$, forming a narrow passage immediately over the passing seed-cup, (see Fig. 6,) in which passage the grains of corn are held substantially in single file and in favorable condition to be pressed into the seed-cups by the spring-finger. Thus each seed-cup will be charged with certainty, and each seed-cup being of the tapering form shown and revolving, as it does, with its open outer side against the wall $a'$ can only receive one grain of corn in its lower part, (see Fig. 4,) while other grains above it that have partly entered the seed-cup will be swept back by the cut-off and the single grain be carried past the cut-off for delivery to the seed-tube $h'$ as the seed-cup is inverted over it by the revolution of the seed-cup disk.

It will be evident from inspection of Fig. 4 that grains of corn of different sizes can enter a proper-sized seed-cup of the tapering kind shown, and that even a small grain in one of the cups will hold all others above it from entering to any extent that the cut-off will not sweep them back out of the seed-cup. The feed-finger E being a spring-plate, its vibratory action will stir and loosen the seed and prevent them clogging or bridging over the passage for the corn at the side of said finger. A feed-finger located as is the finger E and constructed of rigid metal without any spring to it will operate to good advantage; and hence I do not limit my claim in this respect to a finger of spring metal. An overhanging shelf G extends slightly over the higher part of the disk B and directs or guides the seed properly to the disk.

The side $a'$ of the case $a$, as shown, is a glass, mica, or other transparent plate, and is removably held in place by its upper edge resting beneath a flange $a^3$ of the seed-box and its lower edge on a shelf $a^4$, so that it can be drawn out to remove the plate or pressed in to replace it. After seating, the plate or side $a'$ is held by set-screws $a^5$ and washers $a^6$ at its sides.

I am aware that transparent plates have been used below seed measuring and discharging devices in seed-boxes and in connection with seed-detaining mechanism below said devices for exposing to view the discharges of seed or the absence thereof, such as shown in patent to J. C. Barlow, of June 18, 1878, No. 204,941, and I wish to be understood as not claiming the improvement shown and described in said patent; but I am not aware of any use or knowledge prior to my invention thereof of a transparent side or plate at the side of a seed-cup disk, and which, while it exposes to view the action of the seed-cups in receiving their charges of seed or their failure to do so when it occurs, also exposes the cut-off and its action to view, and at the same time serves to retain the seed in the seed-cups, or, in other words, to act as one side for such seed-cups.

I am also aware that seed-measuring disks have been used in which a segmental part of the disks project through an opening in the side of the seed-box to expose the seed-cups; but so far as known to me my improvement is the first to show a seed-measuring disk located within the seed-box and provided with seed-cups in such manner that it could be used at all with a seed-box having a transparent side.

The forward frame H and rear frame I may be of any ordinary or desired construction. The forward frame H, one side only of which is shown, has a runner $h$, seed-conductor tube $h'$, and transverse frame-bars $h^2$ $h^3$. The seed-box is fixed to and in rear of the bar $h^3$, as is also the seed-tube $h'$. The rear frame I, one side only of which is shown, has side frame-bars $i$, transverse bars $i'$ $i^2$, and is pivotally supported by its axle $i^3$ on the wheels J. The side frame-bar $i$ extends forwardly over the shaft C, and has at its forward end a pendent eyebolt $i^4$, which interlocks with a similar bolt $h^4$, projecting upwardly from the bar $h^3$ to form a hinge connection between the forward and rear frames, so that the forward frame can be raised and lowered by tilting the rear frame on the wheels J or axle $i^3$ in an ordinary manner, as indicated by dotted lines at Fig. 8, and as is commonly done by means of a lever. (Not shown.)

L is a sprocket-wheel revoluble on the shaft C. Pins $l$ and $l'$ project radially from the shaft C, the pins $l$ at one end of the hub of the wheel L and the pins $l'$ into an annular groove at the other end of the hub, which is a clutch-box or part coupling $l^2$, fixed to or integral with said sprocket-wheel. These pins or lugs permit the sprocket-wheel to revolve on the shaft C, while securing it against sliding lengthwise thereof. The sprocket-wheel L is geared to rotate with all rotations of the wheel J by a sprocket-chain L' with a sprocket-wheel $j$, which is fixed to and rotated by the wheel J.

M is a truncated-cone-shaped cam-wheel mounted on the shaft C and held to revolve with all rotations of said shaft, while permitted to slide lengthwise thereof by an ordinary spline and seat $m$. A clutch-box or part coupling $m'$ extends from one side of the cam-wheel M and preferably a boss $m^2$ from its other side. The faces of the coupling members $l^2$ and $m'$ have ordinary coacting projections and interdental spaces. A pressure or thrust spring N encircles the shaft C between the boss $m^2$ and pins $m^3$, which project from said shaft, which spring, when free to act, serves as a pressure-organ to slide the cam-wheel M and its box $m'$ into engagement with the other part or member $l^2$ of the clutch-coupling.

When the planter-frames are in the relative positions shown by full lines at Fig. 8 and the forward frame in position for planting, the frame-bar $i$ will be above and out of contact with the cam-wheel M, (see also Fig. 2,) which cam-wheel will then be slid by the spring N, as hereinbefore described, to engage its clutch member with the coacting clutch member fixed to the sprocket-wheel L, and thereby couple the cam-wheel M with the revoluble sprocket-wheel L, whereby the shaft C will be rotated and said shaft C will in turn revolve the seed-cup disks B to bring its revoluble circular series of seed-cups successively past the cut-off for discharge of their contained seed. When the rear frame is tilted to raise the forward frame with its runners above the ground, as is common, for turning the planter around and for carriage on its own wheels, the bar $i$ will come in contact with the inclined periphery of the cam-wheel M as a shipping-lever to slide said cam-wheel into the position shown by dotted lines in Fig. 2, thereby uncoupling the cam-wheel and the sprocket-wheel L and stopping the revolution of the seed-cup disk until the rear frame is reversely tilted to again lower the forward frame for planting, as hereinbefore described. The bar $i$ preferably has one corner chamfered and covered by a wear-plate $i^5$ where it comes in contact with the cam-wheel M.

As shown and described, the planter is specially adapted for planting corn in drills with deposits of seed at short distances apart and with a single grain of corn in each deposit. It will be evident, however, that a check-row mechanism may be adapted to operate a lower valve in the seed-tube to drop an accumulation of the grains for check-row planting and also evident that other seed than corn may be planted with the planter shown.

What I claim as new is—

1. In a corn-planter, in combination, substantially as hereinbefore described, a seed-box and a seed cup-disk having a circular series of seed-cups formed of grooves in its periphery and side, as $b$, revoluble in a vertical plane in the seed-box in contact with one of the flat sides thereof, which side serves as one side of the complete seed-cups and to retain the seed therein until they pass a cut-off successionally and are inverted to discharge the seed.

2. In a corn-planter, in combination, substantially as hereinbefore described, a seed-box and a seed-cup disk substantially a truncated cone in form or having a periphery inclined to its axis of rotation, and a circular series of seed-cups formed of grooves, such as $b$, in its periphery and side, journaled to revolve in a vertical plane in contact with one side of the seed-box, substantially as described, and which side serves as one side of the completed seed-cup, whereby said seed-cups will pass successionally beneath a cut-off which is in contact with the periphery of said disk and are inverted to discharge their contained seed.

3. In a corn-planter, in combination, substantially as hereinbefore described, a seed-box with a transparent side, a seed-measuring disk located within the seed-box and having seed-cups in its periphery and side, journaled to revolve in a vertical plane in contact with said transparent side of the seed-box, which side serves as a side for the seed-cups and to render them, together with the cut-off, visible to the operator.

4. In a corn-planter, in combination, substantially as hereinbefore described, a seed-box, a seed-cup disk having seed-cups formed of grooves in said disk, substantially as described, journaled to revolve in a vertical plane in contact with one side of the seed-box, and a yielding spring feed-finger located substantially as described with reference to the seed-cup disk.

5. In a corn-planter, in combination, substantially as hereinbefore described, a seed-box, a seed-cup disk having seed-cups formed of grooves in said disk, substantially as described, journaled to revolve in a vertical plane in contact with one side of the seed-box, and a yielding spring feed-finger located with reference to the seed-cup disk substantially as described and having a pendent flange $c^2$, for the purpose described.

6. In a corn-planter, in combination, substantially as hereinbefore described, a seed-box, a seed-cup disk having seed-cups formed of grooves in said disk, substantially as described, journaled to revolve in a vertical plane in contact with a transparent side of the seed-box, and a spring feed-finger located with reference to the seed-cup disk substantially as described.

7. In a corn-planter, in combination, substantially as hereinbefore described, a seed-box, a seed-cup disk having seed-cups formed of grooves in said disk, substantially as described, journaled to revolve in a vertical plane in a laterally-contracted lower part of the seed-box and in contact with one side thereof, and and overhanging flange G, for the purpose described.

8. In a corn-planter, in combination, substantially as described, with a seed-cup disk journaled to rotate in a vertical plane with a shaft to which it is fixed and which carries a sprocket-wheel revolubly mounted thereon and provided with one part of a coupling and which is revolved by gear connection with one of the planter-wheels, and a truncated-cone-shaped cam-wheel, also provided with one part of a coupling mounted on and to rotate with said shaft and to slide legthwise thereof and adapted to be operated by one of the frame-bars of the rear frame of the planter, acting as a shipping-lever on its conical periphery to slide it out of coupling with said sprocket-wheel and by a spring to slide it into coupling with said sprocket-wheel, for the purposes specified.

9. In combination with the front and rear frames of a planter hinged to flex in a vertical plane, a shaft having seed-cup disks fixed thereto, a sprocket-wheel revoluble thereon, and a sliding truncated cone-shaped cam mounted thereon, said revoluble sprocket-wheel geared with one of the planter-wheels to revolve therewith, the rear frame-bars hinged at their forward ends to the forward frame in front of said shaft, whereby one of said rear frame-bars acts as a shipping-lever when the forward frame is raised to slide said cam out of gear with the loose pulley L, and a spring for sliding the cam-wheel in an opposite direction.

10. In combination in a corn-planter, as hereinbefore described, a shaft C, with seed-cup disks fixed thereto, a sprocket-wheel L, revoluble on the shaft C, geared to rotate with the wheel J and provided with a clutch-box, a sliding truncated-cone-shaped cam-wheel M, also provided with a clutch-box, a rear frame having side bars $i$ hinged to the forward frame in front of the shaft C, whereby one of them is adapted to act as a shifting-lever to slide the cam-wheel clutch-box out of engagement with the clutch-box of the sprocket-wheel L when the rear frame is tilted to raise the forward frame.

11. In combination in a corn-planter, substantially as hereinbefore described, a shaft C, with seed-cup disks fixed thereto, a loose sprocket-wheel, and a sliding truncated-cone-shaped cam mounted thereon, the sprocket-wheel geared to rotate with the wheel J, a rear frame having side bars hinged at their front ends to the forward frame in front of the shaft C, whereby one of said side bars acts as a shipping-lever to slide the cam-wheel out of coupling with the loose sprocket-wheel when the rear frame is tilted to raise the forward frame.

12. In combination in a corn-planter, as hereinbefore described, a shaft C, with seed-cup disks fixed thereto, a sprocket-wheel L, revoluble on the shaft C, geared to rotate with a wheel J and provided with a clutch-box, a sliding cone-shaped cam-wheel M, provided with a clutch-box, a rear frame having side bars $i$ hinged to the forward frame in front of the shaft C, whereby one of them is adapted to act as a shifting-lever when the front frame is raised to slide the cam-wheel out of coupling with the loose sprocket-wheel, and a spring N, adapted to return the cam-wheel into coupling with said sprocket-wheel when the rear frame is tilted to lower the forward frame for planting.

In testimony whereof I affix my signature in presence of two witnesses.

JOHN C. TUNNICLIFF.

Witnesses:
FRED H. HOLMES,
P. F. BROWN.